United States Patent [19]

Tsigdinos et al.

[11] 4,328,152

[45] May 4, 1982

[54] POLYVINYL CHLORIDE POLYMER COMPOSITIONS CONTAINING TRIZINC DIMOLYBDATE MONOHYDRATE AND ZINC PHOSPHITE FOR SMOKE SUPPRESSION

[75] Inventors: George A. Tsigdinos; Thomas R. Weber, both of Ann Arbor; Fred W. Moore, Plymouth, all of Mich.

[73] Assignee: Amax Inc., Greenwich, Conn.

[21] Appl. No.: 216,894

[22] Filed: Dec. 16, 1980

[51] Int. Cl.³ .......................... C08K 3/32; C08K 3/22
[52] U.S. Cl. ..................................... 524/406; 524/567
[58] Field of Search ....................... 260/42.49, 45.75 W

[56] References Cited

U.S. PATENT DOCUMENTS

| | | | |
|---|---|---|---|
| 3,741,893 | 6/1973 | Mascioli et al. | 260/45.75 B |
| 3,900,441 | 8/1975 | King | 260/45.75 W |
| 3,945,974 | 3/1976 | Schwarcz et al. | 260/45.75 W |
| 4,098,748 | 7/1978 | Moore et al. | 260/DIG. 24 |
| 4,098,753 | 7/1978 | Tsigdinos et al. | 260/31.8 R |

FOREIGN PATENT DOCUMENTS 54-132642 10/1979 Japan .

OTHER PUBLICATIONS

Modern Plastics, Sep. 1979, p. 52, Ca 94, 1981, article 4590f.

*Primary Examiner*—V. P. Hoke
*Attorney, Agent, or Firm*—Michael A. Ciomek; Donald T. Black

[57] ABSTRACT

A smoke suppressed rigid or plasticized polyvinyl chloride polymer composition contains a polyvinyl chloride polymer and a small but effective amount of a smoke suppressant consisting essentially of a mixture of $Zn_3Mo_2O_9 \cdot H_2O$ and $ZnHPO_3$, in an atomic ratio of Mo to P of about 0.5:1 to about 2.0:1, to impart smoke suppression to the polymer composition.

7 Claims, No Drawings

POLYVINYL CHLORIDE POLYMER COMPOSITIONS CONTAINING TRIZINC DIMOLYBDATE MONOHYDRATE AND ZINC PHOSPHITE FOR SMOKE SUPPRESSION

BACKGROUND OF THE INVENTION

This invention relates to vinyl chloride polymers, and specifically to additives which provide smoke suppression to plasticized and rigid polyvinyl chloride ("PVC") polymers without significantly destabilizing such polymers during processing. A "smoke suppressed" PVC polymer composition exhibits "smoke suppression", that is, it exhibits a reduced tendency to generate smoke when it burns, compared to a composition which is not "smoke suppressed".

The excellent mechanical and chemical properties of vinyl chloride homopolymers and copolymers and the versatility of such polymers to compounding variations have resulted in their widespread commercial use for fabricating various structural components, decorative fabrics and films, electrical wiring, floor coverings and the like.

Many commercial applications necessitate the inclusion of substantial quantities, such as about 20 phr to about 100 phr (parts per hundred parts of PVC resin), of ester-type plasticizers in PVC compositions to provide the required degree of flexibility consistent with the intended end use. Other commercial applications of PVC compositions call for the PVC resin to be used in rigid, i.e. unplasticized, form.

Burning of a PVC polymer composition can cause the PVC to degrade, giving off soot and suspended particles which form what is generally termed "smoke". The degradation products can also include aromatic and aliphatic hydrocarbons, carbon oxides, and hydrochloric acid. In the case of plasticized PVC, the compounds forming the smoke can include not only the hydrocarbons, carbon oxides, and HCl from the PVC, but also the plasticizer compounds and degradation products thereof. When the PVC composition is exposed to high temperatures accompanying a fire, the tendency of the PVC to give off smoke can create a source of danger to imperiled personnel which can be greater than the fire itself.

Thus, it is desirable to incorporate into PVC polymer compositions a smoke suppressant, that is, a compound which will inhibit the formation of smoke when the composition burns. A variety of organic and inorganic compounds and salts have heretofore been proposed or used to reduce the smoke generation characteristics of rigid or plasticized PVC polymer compositions, but such agents have had drawbacks such as not providing an optimum improvement in smoke suppression for both rigid and plasticized PVC compositions, and unduly reducing the stability or processability of the polymer composition.

Because of the undesirable effects on the PVC of the elevated temperatures encountered during compounding and fabricating of PVC compositions, it is customary to incorporate into the PVC composition one or more heat stabilizers. The heat stabilizers decrease the vulnerability of the PVC to degradation, and stabilize the PVC against other unwanted thermally induced effects, such as changes in polymer structure, viscosity, and density. However, some agents employed to impart smoke suppression to polyvinyl chloride compositions unduly decrease the heat stability of the polymer compositions in which they are incorporated. In particular, some commercial smoke suppressant additives based on zinc compounds or combinations of zinc compounds with other compounds contain free zinc oxide, which can accelerate the degradation of polyvinyl chloride resins on exposure to temperatures above about 100° C. There is thus a need for a smoke suppressant additive which can be incorporated into a heat stabilized polyvinyl chloride formulation without destabilizing the formulation, that is, without significantly detracting from the heat stability of the polyvinyl chloride composition.

A material which is effective as a smoke suppressant for PVC polymers, and which has recently become available, comprises a talc-extended composition based on $Zn_3Mo_2O_9 \cdot H_2O$. The preparation and properties of this material are shown in greater detail in the examples accompanying this application. As for other smoke suppressants, U.S. Pat. No. 4,098,748 and U.S. Pat. No. 4,098,753 disclose that smoke-suppressant and flame-resistant properties may be imparted to plasticized polyvinyl chloride compositions by additions of about 1 to about 8 phr of $MoO_2$, $MoO_3$, $(NH_4)_2Mo_2O_7$, $(NH_4)_6Mo_7O_{24} \cdot 4H_2O$, $(NH_4)_4Mo_8O_{26}$, $(NH_4)_2Mo_{10}O_{31}$, $Na_2MoO_4$, $CaMoO_4$, or $ZnMoO_4$. U.S. Pat. No. 3,900,441 discloses that "zinc molybdate" of unspecified molecular structure, or alternatively physical mixtures of zinc compounds and molybdenum compounds, can be used as smoke suppressants for polyvinyl chloride-containing compositions. While these smoke suppressants are useful in many applications, they do not comprise or suggest the particular synergistically effective smoke suppressant additive which is incorporated into PVC formulations in accordance with the present invention.

The present invention overcomes many of the problems and disadvantages associated with vinyl chloride polymers by providing a resin formulation including effective amounts of a material which functions as a smoke suppressant agent without detracting from the heat stability and processability of the polymer; which is of comparatively low toxicity; which is not itself volatilized when heated to an elevated pyrolysis temperature, but instead remains in the char; which is more economical than many other agents heretofore employed on a cost-effectiveness basis; which is available in good supply from domestic sources; and which is of versatile use in compounding vinyl chloride polymeric compositions, preferably contributing a white color to the polymer composition to allow coloring and coding of wire and cables.

SUMMARY OF THE INVENTION

The benefits and advantages of the present invention are achieved in a smoke suppressed, rigid or plasticized polyvinyl chloride polymer composition consisting essentially of a polyvinyl chloride polymer and a small but effective amount of a smoke suppressant consisting essentially of a mixture of $Zn_3Mo_2O_9 \cdot H_2O$ and $ZnHPO_3$, in an atomic ratio of Mo to P of about 0.5:1 to about 2.0:1, to impart smoke suppression to the polymer composition.

In a preferred embodiment of the invention, the smoke suppressant is present in the polymer composition extended on a talc carrier.

DETAILED DESCRIPTION OF THE INVENTION

The composition of the resin formulations and the constituents employed are described in the specification and subjoined claims on a weight basis, unless clearly indicated to the contrary. The term "phr" designates the parts by weight per hundred parts by weight of resin.

The term "vinyl chloride polymer", as herein employed, is used in its broad sense and includes polymers of vinyl chloride and vinylidene chloride including homopolymers thereof, copolymers and blends of homopolymers and/or copolymers. The vinyl chloride polymer can contain up to 50% by weight of one other vinyl monomer copolymerized therewith, while amounts of such vinyl monomers up to about 20% are more usual. Such vinyl monomers can include 1-olefins containing from 2 to 12 carbon atoms, and more usually from 2 to 8 carbon atoms, of which ethylene, propylene, 1-butene, isobutylene, 1-hexane, 4-methyl-1-pentene or the like, are typical. The vinyl monomer can also include dienes having from 4 to 10 carbon atoms including conjugated dienes such as butadiene, isoprene, piperylene and the like; ethylidene norbornene and dicyclopentadiene; vinyl esters and allyl esters including vinyl acetate, vinyl chloroacetate, vinyl propionate, vinyl laurate, allyl acetate or the like; vinyl aromatics such as styrene, alpha-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as alpha-cyanomethyl acrylate, the alpha, beta and gamma-cyanopropyl acrylates and the like, olefinically unsaturated carboxylic acids and esters thereof, olefinically unsaturated acids and esters thereof, such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate and the like, and including esters of maleic and fumaric acid and the like; amides of the alpha- or beta-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bisacrylamide, allyl pentaerythritol and the like; bis(betahaloalkyl)alkenyl phosphonates such as bis(beta-chloroethyl) vinyl phosphonate and the like; etc.

The polyvinyl chloride compositions of the present invention can contain heat stabilizing agents, such as barium-cadmium-zinc soaps (widely used in plasticized PVC formulations), organotin compounds (widely used in rigid PVC formulations), epoxidized soya oil, tribasic lead sulfate, and the like, present in effective amounts usually up to about 8 phr.

In addition, the polymer compositions of the present invention can also contain flame retardant, which is conventionally present in an amount of about 1 to about 8 phr. Suitable flame retardants include antimony oxide, sodium antimonate, potassium antimonate, and mixtures thereof. The polymer compositions of the present invention can further include conventional fillers or particulated extenders such as calcium carbonate, talc, silica, alumina trihydrate and the like, which are incorporated as such into the polymer formulation in amounts generally ranging up to about 50 phr; lubricants to facilitate processing of the resin formulation, such as stearic acid, polyethylene, paraffin wax, and the like, in amounts usually up to about 5 phr; as well as various dyes and/or pigment agents to impart the desired color and/or opacity to the resin compositions.

Plasticized PVC polymer compositions within the scope of the present invention also contain one or more plasticizers, which are typically ester-type plasticizers. The amount of the plasticizer is usually between about 20 parts per hundred parts resin (phr) and about 100 parts per hundred parts resin (phr) and is selected to provide a degree of flexibility ranging from semi-rigid at the lower plasticizer contents to very flexible at the higher plasticizer content. The plasticizer is advantageously selected from the group consisting of phthalates, azelates, adipates, trimellitates, and mixtures thereof. Typical of the foregoing ester-type plasticizers which are in widespread commercial use in compounding plasticized polyvinyl chloride resins are di-2-ethylhexyl phthalate, diisodecyl phthalate, ditridecyl phthalate, mixed normal alkyl phthalates, dicyclohexyl phthalate, diundecyl phthalate, butyl benzyl phthalate, and the like; azelate esters including di-2-ethylhexyl azelate, di-n-hexyl azelate, and the like; adipate esters including diisodecyl adipate, dioctyl adipate, and the like; and trimellitate esters including triisooctyl trimellitate, trioctyl trimellitate, and the like.

In addition to the foregoing constituents, the polyvinyl chloride polymer composition of the present invention contains a novel smoke suppressant which is present in an amount effective to impart smoke suppression to the polymer composition. The smoke suppressant consists essentially of a mixture of $Zn_3Mo_2O_9 \cdot H_2O$ and $ZnHPO_3$ in an atomic ratio of Mo to P of about 0.5:1 to about 2.0:1, and advantageously about 0.75:1 to about 1.5:1. Effective smoke suppression combined with efficient Mo usage is provided at a Mo:P ratio of about 0.75:1 to about 1.25:1, and more advantageously of about 1:1.

The amount of the smoke suppressant in the PVC polymer composition is about 0.1 phr to about 20 phr, and preferably about 0.2 to about 10 phr. The smoke suppressant can be added as a compound per se, but is advantageously added in extended form on material such as talc.

In accordance with the present invention, the smoke suppressant can be prepared starting from an aqueous slurry of basic zinc carbonate which is at a temperature between ambient temperature and the boiling point of the slurry. "Basic zinc carbonate" is a generic term familiar to those skilled in this art which identifies material having the approximate composition $2ZnCO_3 \cdot 3Zn(OH)_2$. Molybdenum trioxide ($MoO_3$) and phosphorous acid are then added to the slurry in amounts corresponding to an atomic ratio of Mo:P in the product of about 0.5:1 to about 2.0:1. The molybdenum trioxide can be incorporated as a commercial grade product corresponding to a material which preferably contains at least about 90% molybdenum trioxide. The basic zinc carbonate, molybdenum trioxide, and phosphorous acid react substantially completely to form the desired product. For instance, 5 moles of zinc as basic zinc carbonate, 2 moles of molybdenum trioxide, and 2 moles of phosphorous acid can be reacted together to form a mixture of one mole of $Zn_3Mo_2O_9.H_2O$ and two moles of $ZnHPO_3$ (having a Mo:P ratio of 1:1). The reaction product is filtered from the aqueous medium, dried, and milled to a desired particle size suitable for blending the material into a polyvinyl chloride polymer composition.

The smoke suppressant of the present invention can be prepared extended on talc or another finely divided carrier, and the extended material is then added to the other components of the polymer composition. The amount of ($Zn_3Mo_2O_9.H_2O+ZnHPO_3$) in the talc-extended material is selected to facilitate both the addition of controlled amounts of the smoke suppressant into the polymer composition and the uniform dispersion of the additive within the composition, and generally comprises about 10% to about 35% by weight of the extended material. The extending carrier should be inert to the smoke suppressant and to the materials from which it is formed, should be free of ZnO, and should not present handling or safety problems; for instance, if talc is the extending material it should be free of asbestos. The smoke suppressant, whether extended or unextended, can be combined with the PVC polymer in any of several manners well known in the art to prepare the smoke suppressed composition of the present invention.

In a preferred embodiment of the present invention, which also constitutes the best mode of preparing the smoke suppressant additive of the present invention, finely divided talc extender is slurried in water, basic zinc carbonate, molybdenum trioxide, and phosphorous acid are added to the slurry in the appropriate ratios as described above and allowed to react, and the slurry is then filtered to recover a white, flowable powder which, together with other optional agents exemplified herein, can be compounded with the polyvinyl chloride polymer in any of various manners well known in the art.

The particle size of the extended or unextended smoke suppressant is not particularly critical, although it is generally desirable to employ particles of a size and configuration so as to optimize total surface area in order to render the material available for reaction and to facilitate uniform dispersibility throughout the polyvinyl chloride resin matrix.

It is noteworthy that a mixture of $Zn_3Mo_2O_9.H_2O$ and $ZnHPO_3$ employed in a Mo:P ratio of about 0.5 to about 2.0 represents a synergistically effective smoke suppressant for PVC polymer compositions compared to a like amount of only $Zn_3Mo_2O_9.H_2O$ or only $ZnHPO_3$. The present invention thereby provides a means for obtaining increased smoke suppression for a given quantity of molybdenum consumed. This observation is particularly unexpected because $ZnHPO_3$ is by itself not a particularly effective smoke suppressant. The $ZnHPO_3$ component should be distinguished from phosphate compounds such as $Zn_3(PO_4)_2$, since $ZnHPO_3$ is demonstrably superior in the composition of this invention.

In order to illustrate further the smoke suppressant characteristics of polyvinyl chloride polymer compositions prepared according to the present invention, the following specific examples are provided. It will be understood that the examples are supplied for illustrative purposes and are not intended to limit the scope of the present invention as herein described and as set forth in the claims.

EXAMPLE 1

Three batches of the smoke suppressant of the present invention, consisting essentially of mixtures of $Zn_3Mo_2O_9.H_2O$ and $ZnHPO_3$ extended on talc, were prepared as follows.

Additive A ($Zn_3Mo_2O_9.H_2O+ZnHPO_3$) on talc 253.0 g. of talc (Pfizer Microtalc MP 10–52) were added to 1180 ml of deionized water with agitation, and the resulting slurry was heated to 90° C. Then 54.1 g of basic zinc carbonate (equivalent ZnO content 73.46%) were added, followed by 53.3 g of 30% $H_3PO_3$ over a 15-minute period. Beginning ten minutes after the last of the acid was added, 28.1 g of $MoO_3$ were added slowly. Thus, the reagents were added at a Zn:Mo:P atomic ratio of about 5:2:2. The slurry was held at 90° C. for $3\frac{1}{2}$ hours, and then cooled and filtered. The filter cake was dried at 110° C. overnight and then at 200° C. for about 4 hrs. The dried product, which weighed 330 g, was then ground with a mortar and pestle. The product contained 9.22 wt.% Zn, 5.37 wt.% Mo, and 1.80 wt.% P, for an atomic ratio of Zn:Mo:P of about 5.02:2.00:2.08. The talc extended additive thus contained about 23.8 wt.% ($Zn_3Mo_2O_9.H_2O+ZnHPO_3$).

Additive B ($Zn_3Mo_2O_9.H_2O+ZnHPO_3$) on talc 1518 g of talc (Pfizer Microtalc MP 10–52), 323.4 g of basic zinc carbonate (equivalent ZnO content 73.65%), 319.8 g of 30% $H_3PO_3$, and 168.6 g of $MoO_3$ were combined in 8.0 liters of deionized water following the procedure used to make Additive A. The dried product, which weighed 2.0 kg, contained 8.93 wt.% Zn, 5.14 wt.% Mo, and 1.67 wt.% P, for an atomic ratio of Zn:Mo:P of 5.10:2.00:2.02. The talc-extended additive thus contained about 22.7 wt.% ($Zn_3Mo_2O_9.H_2O+ZnHPO_3$).

Additive C ($Zn_3Mo_2O_9.H_2O+ZnHPO_3$) on talc 34.5 kg of talc (Pfizer Microtalc MP 10–52) were added to 182 liters of deionized water with agitation, and the resulting slurry was heated to 90° C. Then 7.3 kg of basic zinc carbonate (equivalent ZnO content 73.65%) were added, followed by 7.3 kg of 30% $H_3PO_3$ over a one-hour period. Beginning ten minutes after the last of the acid was added, 3.8 kg of $MoO_3$ were added over a 20-minute period. Thus, the reagents were added at a Zn:Mo:P atomic ratio of 5:2:2. The slurry was held at 90° C. for $3\frac{1}{2}$ hours, and then cooled and filtered. The filter cake was dried at 110° C. for 16 hrs. and then at 200° C. for 3 hrs. The dried product, which weighed 43.8 kg, was then hammer milled. The product contained 8.55 wt.% Zn, 5.07 wt.% Mo, and 1.80 wt.% P, for an atomic ratio of Zn:Mo:P of 4.95:2.00:2.21. The talc-extended additive thus contained about 23.0 wt.% ($Zn_3Mo_2O_9.H_2O+ZnHPO_3$).

EXAMPLE 2

For purposes of comparison, quantities of several other additives were prepared by the following procedures.

Additive D

($Zn_3Mo_2O_9 \cdot H_2O$ on talc)

42.0 kg of talc (Pfizer Microtalc MP 10-52) were slurried in 208 l of water, and the slurry was heated to 90° C. 6.5 kg of basic zinc carbonate (68.78% ZnO equivalent) was added to the slurry and then 5.3 kg of $MoO_3$ was added gradually, allowing for evolution of $CO_2$. The Zn:Mo atomic ratio of the reagents was about 3:2. After one hour at 90° C., the resulting mixture was cooled and filtered, and the recovered solids were dried overnight at about 115° C. and then for 3 hours at 200° C. The dried product was then hammer milled to produce 50.9 kg of a white, free-flowing powder containing about 18.5 wt.% $Zn_3Mo_2O_9 \cdot H_2O$. The product contained 6.74 wt.% Zn and 6.30 wt.% Mo.

Additive E

($ZnHPO_3$ on talc)

253.0 g of talc (Pfizer Microtalc MP 10-52) were added to 1180 ml of deionized water with agitation, and the resulting slurry was heated to 90° C. Then 54.0 g of basic zinc carbonate (equivalent ZnO content 73.65%) were added, followed by the addition of 133.6 g of 30% $H_3PO_3$ over a 25-minute period. The slurry was held at 90° C. for 3½ hours, and then cooled and filtered. The filter cake was dried overnight at 110° C., and then at 200° C. for 2½ hours. The dried product, which weighed 319 g, was ground with a mortar and pestle. The talc-extended product contained 9.17 wt.% Zn and 4.60 wt.% P, and thus contained about 20 wt.% $ZnHPO_3$.

Additive F

($Zn_3Mo_2O_9 \cdot H_2O + Zn_3(PO_4)_2 \cdot 2H_2O$) on talc

This product was prepared following the procedure used to prepare Additive A, with the sole difference that phosphoric acid ($H_3PO_4$) was used instead of phosphorous acid ($H_3PO_3$). The dried product, which weighed 328 g, contained 10.4 wt.% Zn, 5.4 wt.% Mo, and 1.75 wt.% P, and thus contained about 26 wt.% ($Zn_3Mo_2O_9 \cdot H_2O + Zn_3(PO_4)_2 \cdot 2H_2O$).

Additive G

$ZnMoO_4 \cdot 0.8H_2O$ on talc 1.8 kg of talc (Pfizer Microtalc MP 10-52) were added to 7.0 liters of deionized water with agitation, and the resulting slurry was heated to 90° C. Then 0.21 kg of basic zinc carbonate (equivalent ZnO content 73.1%) was added, followed by the gradual addition of 0.27 kg of $MoO_3$, providing an atomic Zn:Mo ratio of about 1:1. This slurry was held at 90° C. for 1 hr, and then cooled and filtered. The filter cake was dried at 110° C. overnight and then at 200° C. for about 7 hrs. The dried product, which weighed 2.11 kg, was then hammer milled. The product contained 5.3 wt.% Zn and 7.4% Mo, for an atomic ratio of Zn:Mo of 1.05:1. The talc-extended additive thus contained about 18.5 wt.% $ZnMoO_4 \cdot 0.8H_2O$.

In the following examples, several different generally accepted smoke generation tests were employed to demonstrate the improved smoke suppressant properties of the present invention. Briefly stated, the test procedures are as follows:

Arapahoe test: a small sample (1.5×0.5×0.125" or 3.8×1.3×0.3 cm) is burned with a propane flame for 30 seconds in an enclosed chamber and the combustion products are continuously drawn through a fiberglass filter paper by a vacuum source. The weight of smoke is determined by the increase in weight of the filter paper and the weight of the sample consumed is found by weighing the sample before and after testing. The results are expressed in terms of percent smoke by converting the ratio of smoke weight to sample consumed to a percentage.

NBS smoke chamber test (ASTM E-662-79): a 3-inch-square specimen is supported vertically in a frame within a completely closed cabinet (e.g. 36×24×36 in) such that an area 6.57 $in^2$ is exposed to heat. A heat source, which in these tests was an electric furnace, is adjusted to provide heat flux of 2.5 watts (W)/$cm^2$ under flaming conditions to the specimen surface. Light absorption in the area above the specimen is measured using a standard photometer; increased smoke generation produces a higher light absorption reading. Results are given as the maximum specific optical density derived from a geometrical factor and the measured optical density.

Ohio State Release Rate ("OSRR") test: a 6-inch-square specimen 3.2 mm (⅛-inch) in thickness is supported vertically in a chamber having a fixed air flow rate through the chamber. The specimen is exposed to a given heat flux and a small pilot flame impinging at the center of the bottom of the specimen. The amount of smoke formed is measured by a photocell in the chimney and plotted as a function of time. The smoke data are expressed in "SMOKE" units defined so that air having a concentration of one SMOKE/$m^3$ reduces the transmission of light by 10% on a linear scale (i.e. from 80% transmission to 70%, or from 45% to 35%). A value is obtained for total smoke released either in a given period of time or for the time during which heat is released.

In the following Examples, additions of additives are given in phr of talc-based material; the corresponding phr of active ingredient can be derived from the additive content of the talc-based material.

EXAMPLE 3

Smoke suppression by various additives was determined in a rigid PVC conduit formulation having the following constituents:

| | |
|---|---|
| Polyvinyl chloride resin ("Geon 103 EP F76", B.F. Goodrich) | 100 parts by weight |
| Coated whiting (filler) ("Omyalite 90T", Omya) | 25 parts by weight |
| Processing aid ("Acryloid K120N", Rohm and Haas) | 3 parts by weight |
| Tin stabilizer ("Thermolite 31", M&T Chemicals) | 1 parts by weight |
| Lubricant ("Plastiflow POP", NL Industries) | 0.6 parts by weight |
| Lubricant (Calcium stearate) | 0.8 parts by weight |
| Lubricant ("Lubricin 25", NL Industries) | 0.5 parts by weight |

The smoke generation of this formulation with and without various additives was determined using the three tests described above, and the results are set forth below in Table I.

The data in Table I illustrate that the PVC compositions of the present invention containing ($Zn_3Mo_2O_9 \cdot H_2O + ZnHPO_3$) exhibit smoke suppression which is significantly superior to that exhibited by the PVC compositions containing the other additives tested. Indeed, comparing the effects of Additives A, B, and C with Additives D and E, it is seen that the present invention provides smoke suppression which is superior to that provided by $Zn_3Mo_2O_9.H_2O$ alone, and by $ZnHPO_3$ alone, and is also superior to that which could be expected even if one had reason to add together the separate smoke reduction values of those two compounds. For instance, referring to Table 1, Additive A (a smoke suppressant of the present invention) provided a smoke reduction of 38%, whereas one might expect to have to use twice as much total additive (adding together 10 phr of each of Additives D and E) to achieve the same cumulative degree of smoke reduction. However, any predictions based on the addition of properties of compounds considered individually should not be relied on. The present invention must therefore be considered synergistic and unobvious.

TABLE I

| Additive | Arapahoe Smoke (% Reduction) | | NBS Smoke (% Reduction) | | OSRR Smoke (% Reduction) | | |
|---|---|---|---|---|---|---|---|
| | | | | | 5w/cm² | 3w/cm² | |
| None (control) | 7.8% | (—) | 314 | (—) | 965 | (—) | 703 (—) |
| A, 10 phr | 4.8% | (38%) | — | | — | | — |
| B, 10 phr | 4.9% | (37%) | 199 | (37%) | 369 | (64%) | 158 (78%) |
| C, 10 phr | 5.1% | (35%) | — | | — | | — |
| D, 10 phr | 5.6% | (28%) | 217 | (31%) | 506 | (48%) | 309 (56%) |
| E, 10 phr | 7.0% | (10%) | — | | — | | — |
| F, 10 phr | 5.4% | (31%) | — | | — | | — |
| G, 10 phr | 5.1% | (35%) | — | | — | | — |
| B, 5 phr | 6.1% | (22%) | — | | — | | — |
| C, 5 phr | 5.1% | (35%) | 186 | (41%) | 343 | (65%) | — |
| D, 5 phr | 6.7% | (14%) | 180 | (43%) | 550 | (43%) | — |
| B, 15 phr | 4.8% | (38%) | — | | — | | — |
| D, 15 phr | 5.3% | (32%) | — | | — | | — |

EXAMPLE 4

The smoke suppressant property of the present invention was tested on a plasticized PVC jacket formulation having the following constituents:

| | |
|---|---|
| Polyvinyl chloride resin ("Geon 103 EP F76", B.F. Goodrich) | 100 parts by weight |
| Mixed-alkyl phthalate (plasticizer) ("Santicizer 711", Monsanto) | 40 parts by weight |
| Alumina trihydrate (filler) ("Hydral 710", Aluminum Co. of America) | 15 parts by weight |
| Tribasic lead sulfate (heat stabilizer) ("Tribase XL", NL Industries) | 5 parts by weight |
| Wax | 0.5 parts by weight |
| Lead stearate (processing lubricant, "DS-207", NL Industries) | 0.2 parts by weight |
| Lubricant ("Plastiflow POP", NL Industries) | 0.2 parts by weight |
| $Sb_2O_3$ (flame retardant) | 3 parts by weight |

The smoke generation of this formulation with and without various additives was determined by the three tests described above, and the results are set forth in Table II.

Again, the superior and synergistic effect of the smoke suppressant of the present invention is seen in comparing Additives A, B, or C comprising ($Zn_3Mo_2O_9.H_2O + ZnHPO_3$) to Additives D and E, which comprise the separate components of the novel smoke suppressant.

TABLE II

| Additive | Arapahoe Smoke (% Reduction) | | NBS Smoke (% Reduction) | | OSRR, 3w/cm² (5 min.) Smoke (% Reduction) | |
|---|---|---|---|---|---|---|
| None (control) | 11.3% | (—) | 536 | (—) | 487 | (—) |
| A, 6 phr | 7.1% | (37%) | — | | — | |
| B, 6 phr | 7.4% | (35%) | — | | 350 | (28%) |
| C, 6 phr | 7.0% | (38%) | 256 | (52%) | — | |
| D, 6 phr | 8.1% | (28%) | — | | 373 | (23%) |
| E, 6 phr | 10.2% | (10%) | — | | — | |
| F, 6 phr | 8.4% | (26%) | — | | — | |
| G, 6 phr | 6.9% | (39%) | — | | — | |

EXAMPLE 5

Smoke suppression by various additives was determined in a plasticized PVC wire insulation formulation having the following constituents:

| | |
|---|---|
| Polyvinyl chloride resin ("Geon 103 EP F76", B.F. Goodrich) | 100 parts by weight |
| Di-isodecyl phthalate (Plasticizer) | 30 parts by weight |
| Tribasic lead sulfate (heat stabilizer) ("Tribase XL", NL Industries) | 7 parts by weight |
| Wax (lubricant) ("Acrawax C", Glyco Chemicals) | 0.4 parts by weight |
| Lead stearate (lubricant) ("DS-207", NL Industries) | 0.4 parts by weight |
| $Sb_2O_3$ (flame retardant) | 2 parts by weight |

The smoke generation of this formulation with and without various additives was determined using the three tests described above, and the results are set forth in Table III. Table III again illustrates the significant and unobvious improvement in smoke suppression afforded by the present invention.

TABLE III

| Additive | Arapahoe Smoke (% Reduction) | | NBS Smoke (% Reduction) | |
|---|---|---|---|---|
| None (control) | 16.3% | (—) | 502 | (—) |
| A, 4 phr | 8.2% | (50%) | — | |
| B, 4 phr | 8.5% | (48%) | — | |
| C, 4 phr | 8.4% | (48%) | 279 | (44%) |
| D, 4 phr | 10.1% | (38%) | 338 | (33%) |
| E, 4 phr | 11.6% | (29%) | — | |
| G, 4 phr | 9.2% | (44%) | — | |

What is claimed is:

1. A smoke suppressed, rigid or plasticized polyvinyl chloride polymer composition consisting essentially of a polyvinyl chloride polymer, and a small but effective amount of a smoke suppressant essentially free of ZnO and consisting essentially of a mixture of $Zn_3Mo_2O_9.H_2O$ and $ZnHPO_3$, in an atomic ratio of Mo to P of about 0.5:1 to about 2.0:1, to impart smoke suppression to the polymer composition.

2. The composition of claim 1 wherein the atomic ratio of Mo to P is about 0.75:1 to about 1.5:1.

3. The composition of claim 1 wherein the atomic ratio of Mo to P is about 0.75:1 to about 1.25:1.

4. The composition of claim 1 wherein the atomic ratio of Mo to P is about 1:1.

5. The composition of claim 1, 2, 3, or 4 wherein said smoke suppressant is present in said composition in an amount between about 0.1 parts per hundred parts resin and about 20 parts per hundred parts resin.

6. The composition of claim 5 wherein said smoke suppressant is present in said composition in an amount between aboout 0.2 parts per hundred parts resin and about 10 parts per hundred parts resin.

7. The composition of claim 1 wherein said smoke suppressant is extended on a particulate carrier.

* * * * *